(12) United States Patent
Bringuier

(10) Patent No.: US 6,301,413 B1
(45) Date of Patent: Oct. 9, 2001

(54) FIBER OPTIC CABLE WITH FLAME INHIBITING CAPABILITY

(75) Inventor: Anne G. Bringuier, Taylorsville, NC (US)

(73) Assignee: Siecor Corporation, Hickory, NC (US)

( * ) Notice: Subject to any disclaimer, the term of this patent is extended or adjusted under 35 U.S.C. 154(b) by 0 days.

(21) Appl. No.: 09/648,280

(22) Filed: Aug. 23, 2000

Related U.S. Application Data

(63) Continuation of application No. 08/938,981, filed on Sep. 26, 1997, now Pat. No. 6,122,424.

(51) Int. Cl.[7] ................................................. G02B 6/44
(52) U.S. Cl. .......................... 385/100; 385/109; 385/113; 385/114
(58) Field of Search .................................. 385/100, 102, 385/109, 114, 107, 113

(56) References Cited

U.S. PATENT DOCUMENTS

| | | | |
|---|---|---|---|
| 3,944,717 | * | 3/1976 | Hacker et al. ................... 385/100 X |
| 5,131,064 | * | 7/1992 | Arroyo et al. ...................... 385/102 |
| 5,133,034 | * | 7/1992 | Arroyo et al. ...................... 385/107 |
| 5,136,683 | * | 8/1992 | Aoki et al. .......................... 385/141 |
| 5,206,926 | * | 4/1993 | Yamamoto et al. ................. 385/143 |
| 5,253,318 | * | 10/1993 | Sayegh et al. ...................... 385/114 |
| 5,345,525 | * | 9/1994 | Holman et al. ..................... 385/104 |
| 5,358,011 | * | 10/1994 | Stockton et al. ................... 138/103 |
| 5,388,175 | * | 2/1995 | Clarke ................................. 385/100 |
| 5,566,266 | * | 10/1996 | Nave et al. ......................... 285/113 |
| 6,122,424 | * | 9/2000 | Bringie .............................. 385/100 |

\* cited by examiner

*Primary Examiner*—Brian Healy
(74) *Attorney, Agent, or Firm*—Timothy J. Aberle

(57) ABSTRACT

A fiber optic cable (10) includes a conventional optical fiber ribbon stack (12) with optical fiber ribbons having optical fibers. Ribbon stack (12) is disposed in a water blocking material (13) which, in turn, is surrounded by a core tube (14). Core tube (14) is surrounded by an outer jacket (15). The space between core tube (14) and jacket (15) includes fiber optic cable components (20,30,40). Cable component (20) provides strength and flame inhibiting capabilities to fiber optic cable (10) and may include a water blocking capability. Cable component (30) comprises a flame inhibiting capability, and may include a water blocking capability. Cable component (40) provides anti-buckling and flame inhibiting capabilities to fiber optic cable (10) and may include a water blocking capability. Fiber optic cable (10) meets flame and water blocking requirements, is manufactured at a low unit cost, and is easy to route through cable passageways.

6 Claims, 2 Drawing Sheets

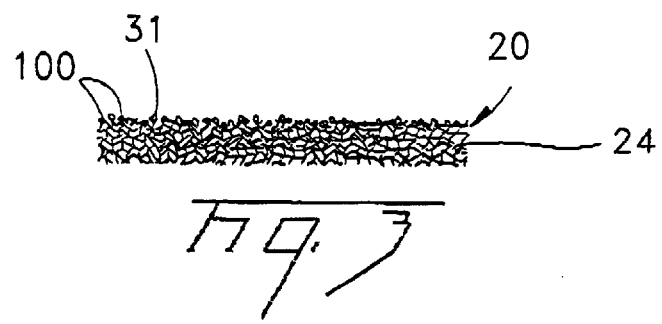
Fig. 3
Fig. 4
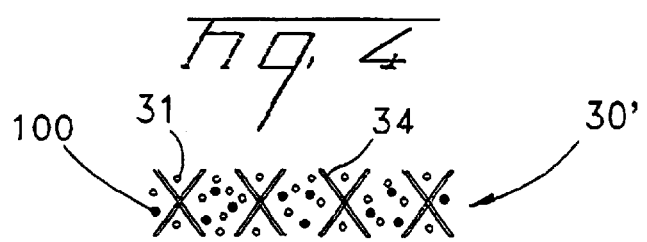
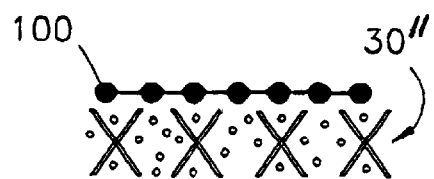
Fig. 5
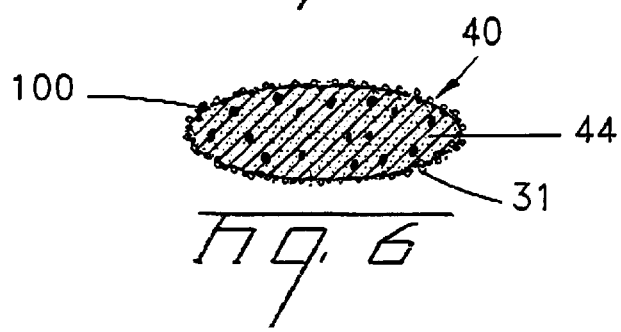
Fig. 6
Fig. 7
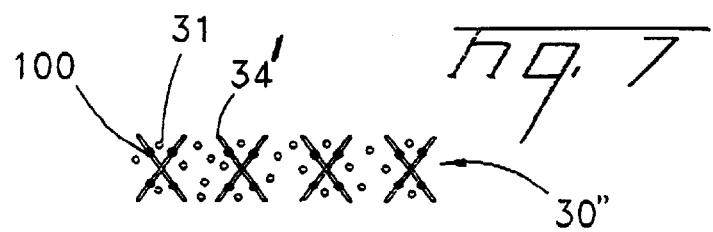

FIBER OPTIC CABLE WITH FLAME INHIBITING CAPABILITY

This application is a continuation of Ser. No. 08/938,981 filed Sep. 26, 1997, U.S. Pat. No. 6,122,424.

BACKGROUND OF THE INVENTION

The present invention relates to a fiber optic cable having flame retardance capabilities.

Conventional fiber optic cables comprise optical fibers which are used to transmit voice, video, and data information. Indoor and indoor/outdoor fiber optic cables have been developed for installation in plenums, risers, and ducts of buildings. Fiber optic cables suitable for indoor use are required to meet flame retardance standards for the prevention, inhibition, and/or extinguishment of flame. A cable's ability to prevent, inhibit, or extinguish the spread of flames is determined by means of horizontal and vertical flame tests. In addition to flame tests, indoor/outdoor cables must meet water blocking requirements for the prevention of the flow of water therein.

Materials used for the prevention, inhibition, and/or extinguishment of flame may fall into two general categories. The first category includes inherently inflammable, flame-resistant materials which are thermally stable, and may have high decomposition temperatures, for example, certain metals or high temperature plastics. The materials included in the first category are useful as thermal/heat/flame barriers. Thermal/heat/flame barriers may have disadvantages, namely: they are generally expensive; and, because of limited burn-performance characteristics, they can be used in but a narrow range of applications. The second general category of materials used for the prevention, inhibition, and/or extinguishment of flame includes inherently flammable materials which have been chemically altered to include flame inhibiting agents, which agents actively interfere with the chemical reactions associated with combustion. Examples of inherently flammable materials are polyethylene, polypropylene, polystyrene, polyesters, polyurethanes, and epoxy resins. By comparison, thermal/heat/flame barriers typically do not include flame inhibiting agents, but rather are relied upon in flame protection designs for their resistance to decomposition at high temperatures, or their inherent heat dissipation or flame barrier properties.

An example of a fiber optic cable with some inherent thermal/heat resistance ability is disclosed in US-A 5261021, which cable includes a tape wrapped around conductors. The tape comprises a corrugated metal strip, a layer of adhesive, and a superabsorbent powder layer applied to the adhesive layer, which layers collectively comprise a thermal/heat/flame barrier. The tape is then wrapped around the conductors so that longitudinally extending edges of the tape are positioned in overlapping engagement. Although this known fiber optic cable has some thermal/heat resistance and water blocking features, this design has several disadvantages. For example, the tape requires three layers of material, the collective thicknesses and stiffnesses of which layers result in a large, heavy, and stiff fiber optic cable. The size, weight, and stiffness of this known fiber optic cable make the cable difficult to route through cable passageways during installation. Additionally, the manufacture of the tape requires the purchase and preparation of the metal strip, adhesive, and water blocking powder, and the combination thereof into a tape structure. The expense of manufacturing the tape necessarily contributes to the cost of production of the fiber optic cable. Moreover, although the metal layer may dissipate heat, it is typically grounded during installation.

An example of a fiber optic cable having a non-metallic thermal/heat/flame barrier suitable for indoor use is disclosed in U.S. Pat. No. 5,566,266. This known cable is an optical service cable with a core tube having a stack of optical fiber ribbons. The core tube is filled with a hydrophobic water-blocking compound having a flame retardant material mixed therein. The known cable further includes two layers of water swellable tape, and a layer comprising a flame resistant tape. The flame resistant tape is made of a polyimide, e.g. a KAPTON or a TEFLON material. The two water-swellable tape layers and the flame resistant tape layer have associated material costs which contribute to the cost of production of the fiber optic cable. Moreover, the respective thicknesses and stiffnesses of the layers contribute to the overall size and stiffness of the cable which may make the cable difficult to route through passageways.

A thermal/heat/flame barrier for blocking heat flow into a cable core during a lightning strike is disclosed in U.S. Pat. No. 5,131,064. This known fiber optic cable is designed for use in outside plant environments and includes a core comprising optical fiber ribbons and a mechanically strengthened, thermal barrier layer disposed about a plastic tubular member. A metallic shield and a plastic jacket surround the thermal barrier layer. The thermal barrier layer comprises a temperature resistant tape which is made of a woven glass or aramid fibrous material. The thermal barrier layer is a laminate comprising a high temperature resistant tape and at least one other tape with a superabsorbent powder thereon. Although the known fiber optic cable has thermal and water blocking protection, this design has several disadvantages. For example, the laminate requires a relatively thick woven glass or aramid fiber layer, and at least one water blocking layer, the respective thicknesses and stiffnesses of which layers combine to result in a large, heavy, and stiff fiber optic cable. The size, weight, and stiffness of this known fiber optic cable make the cable difficult to route through cable passageways during installation. Additionally, manufacture of the cable requires the purchase, preparation, and lamination of the woven glass or aramid fiber and water blocking layers, which contributes to the cost of production of the cable.

Other thermal/heat/flame barriers used in fiber optic cables include: a KEVLAR tape as disclosed in U.S. Pat. No. 4,143,942; a TEFLON tape as disclosed in U.S. Pat. No. 5,185,840; and a layer of a multi-layer buffer tube wall, which layer includes hollow glass fillers as disclosed in U.S. Pat. No. 5,495,546. The respective thermal/heat/flame barriers of the foregoing fiber optic cables do not include flame inhibiting agents. Moreover, the respective sizes, weights, and stiffnesses of the barriers may make the cables difficult to route through cable passageways during installation. Additionally, the KEVLAR and TEFLON materials and specialized buffer tube layer with glass fillers may be expensive.

The second general category of materials used for the prevention, inhibition, and/or extinguishment of flame, as noted hereinabove, includes inherently flammable materials which have been chemically altered to include flame inhibiting agents. With respect to conventional fiber optic cables and optical fibers, the materials in the jackets of the cables and optical fibers are modified to include one or more flame inhibiting agents. Fiber optic cable jackets are different from substrates because they represent a mass of material which is a solid cross section, not including interstices.

A known fiber optic cable jacket which includes an active flame inhibiting agent is disclosed in U.S. Pat. No. 5,358, 011, wherein the jacket includes a polyolefin compound Megolon S300. This compound is a blend of co-polymers with an inorganic compound included as a flame inhibiting agent, namely, aluminum trihydrate. U.S. Pat. No. 5,133,034 discloses a jacket formed of a polyolefin based material including a metal hydroxide filler as a flame inhibiting agent.

U.S. Pat. No. 5,136,683 discloses a plastic optical fiber with a common matrix jacket formed of a flame retardant material having an Oxygen Index (OI) of at least 32. The OI allows a simple determination of a material's flammability, it is a measure of a material's relative flammability as compared to other materials that are capable of burning in oxygen, i.e. the percentage of oxygen in a gas needed to support combustion. A jacket material with a high OI is desirable because it indicates low flammability. Jacket materials disclosed in U.S. Pat. No. 5,136,683 which may have an acceptable OI are chlorinated polyethylene, polyethylene, PVC, an EVA-type polymer, a water-crosslinked polyolefin, polyvinylidene chloride, polyvinylidene fluoride, polyfluoroethylene, and other halogen containing polymers. Flame inhibiting agents for chemically altering jacket materials may include, for example, tetrabromoethane, chlorinated paraffin, chlorinated polyethylene, tetrabromobisphenol A, and phosphate compounds. The preferred inorganic compounds are indicated as being antimony trioxide and aluminum hydroxide. Another plastic optical fiber is disclosed in U.S. Pat. No. 5,206,926, wherein the plastic fiber is described as including a jacket material comprising a single polymer or a mixture of polymers with a flame inhibiting additive having an OI of at least 25.

Polyvinyl chloride (PVC) as a pure polymer is inherently flame inhibiting because of its high chlorine content but plasticizers are typically flammable. Known fiber optic cables which include PVC as a jacket material are U.S. Pat. No. 5,345,525 and U.S. Pat. No. 5,253,318. PVC may not, however, be a highly desirable jacketing material in all circumstances because of the potential for the evolution of unacceptable levels of toxic gases during burning. Moreover, the foregoing cable and optical fiber jackets do not include water blocking capabilities for preventing the longitudinal flow of water.

A known electrical cable having a flame inhibiting agent mixed with a water blocking substance is described in U.S. Pat. No. 3,944,717. The electrical cable includes a core with insulated electrical conductors. During manufacture of the electrical cable, the entire cross section of the core is advanced through a bath of a filling composition including a chlorinated paraffin for flame retardancy and water blocking, a polyvinyl chloride resin base for viscosity, and a chlorinated polyethylene for adherence to insulated conductors. Although this known electrical cable has flame inhibiting and water blocking capabilities, the design thereof has several disadvantages. For example, this cable is not craft-friendly because the filling composition makes the cable heavy and therefore difficult to route through passageways during installation, and the filling composition is difficult to remove from the conductors. Additionally, manufacture of the cable requires the purchase, preparation, and processing of the chlorinated paraffin, polyvinyl chloride resin base, and chlorinated polyethylene, which altogether contribute to the production costs of the cable. Also, the filling compound may not reach all of the interstices between the conductors thereby creating the potential for leak-paths. Furthermore, compared to the optical fibers of a fiber optic cable, the known electrical cable is disadvantageous because the electrical conductors thereof have smaller bandwidths than optical fibers, and the electrical conductors are subject to higher power loss. Moreover, the electrical conductors are subject to electromagnetic interference, impedance, and electrical cross talk. Further, electrical cables are generally heavier and larger than comparable fiber optic cables, making electrical cables comparatively more difficult to install than optical fiber cables. Finally, because the known electrical cable emits electromagnetic energy, it is easier to wire-tap and is therefore less secure than a fiber optic cable.

OBJECTS OF THE INVENTION

It is an object of the present invention to provide a low cost fiber optic cable which meets flame retardance standards, yet is craft-friendly.

It is an object of the present invention to provide a fiber optic cable component comprising a substrate with flame inhibiting capabilities.

It is an object of the present invention to provide a fiber optic cable component comprising a substrate having flame inhibiting and water blocking capabilities.

It is another object of the present invention to provide a fiber optic cable component for anti-buckling of the cable, which component includes flame inhibiting capabilities.

It is another object of the present invention to provide a fiber optic cable component for providing strength to the cable, which component includes flame inhibiting capabilities.

BRIEF DESCRIPTION OF THE DRAWINGS

FIG. 3 is a cross section of a fiber optic cable component comprising strength members with a flame inhibiting capability.

FIG. 4 is a schematic view of a fiber optic cable component comprising a first substrate with flame inhibiting capabilities according to the present invention.

FIG. 5 is a schematic view of a fiber optic cable component comprising a second substrate with flame inhibiting capabilities according to the present invention.

FIG. 6 is a cross section of a fiber optic cable component comprising an anti-buckling member with flame inhibiting capabilities according to the present invention.

FIG. 7 is a schematic view of a third substrate with flame inhibiting capabilities according to the present invention.

DETAILED DESCRIPTION OF THE INVENTION

Figure 1:
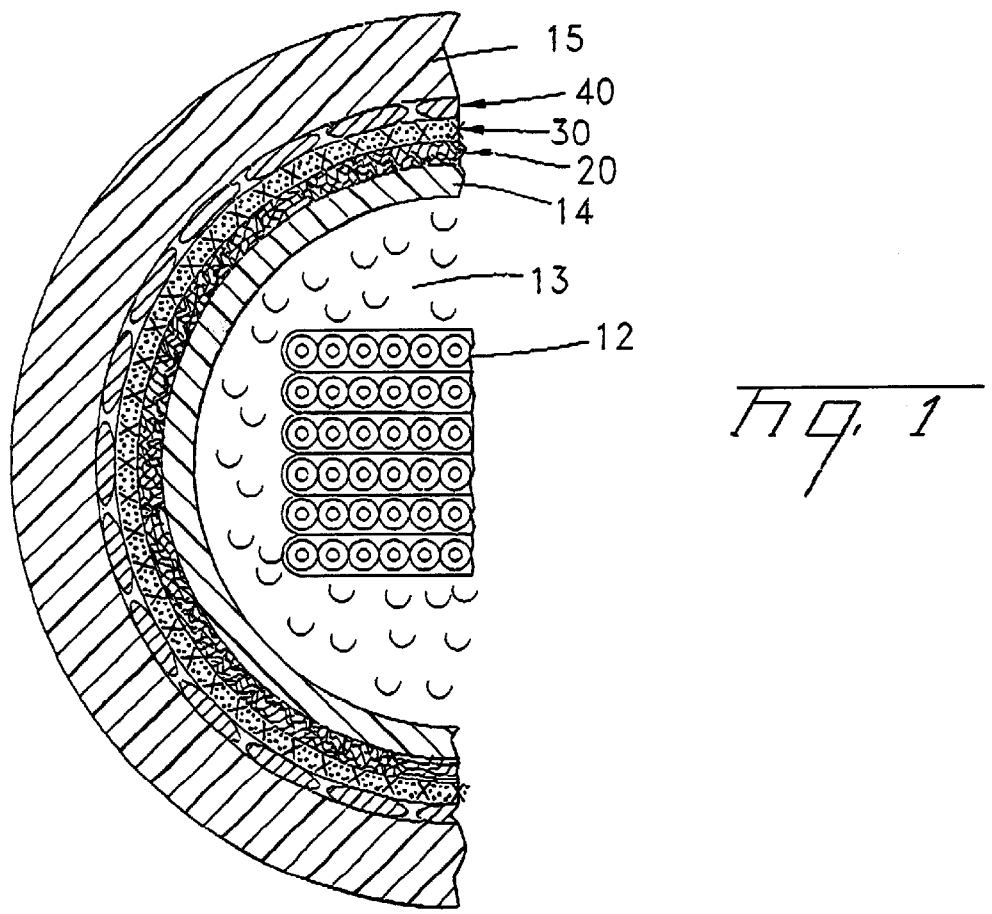
FIG. 1 is a partial cross sectional view of a fiber optic cable comprising cable components according to the present invention.
Figure 2:
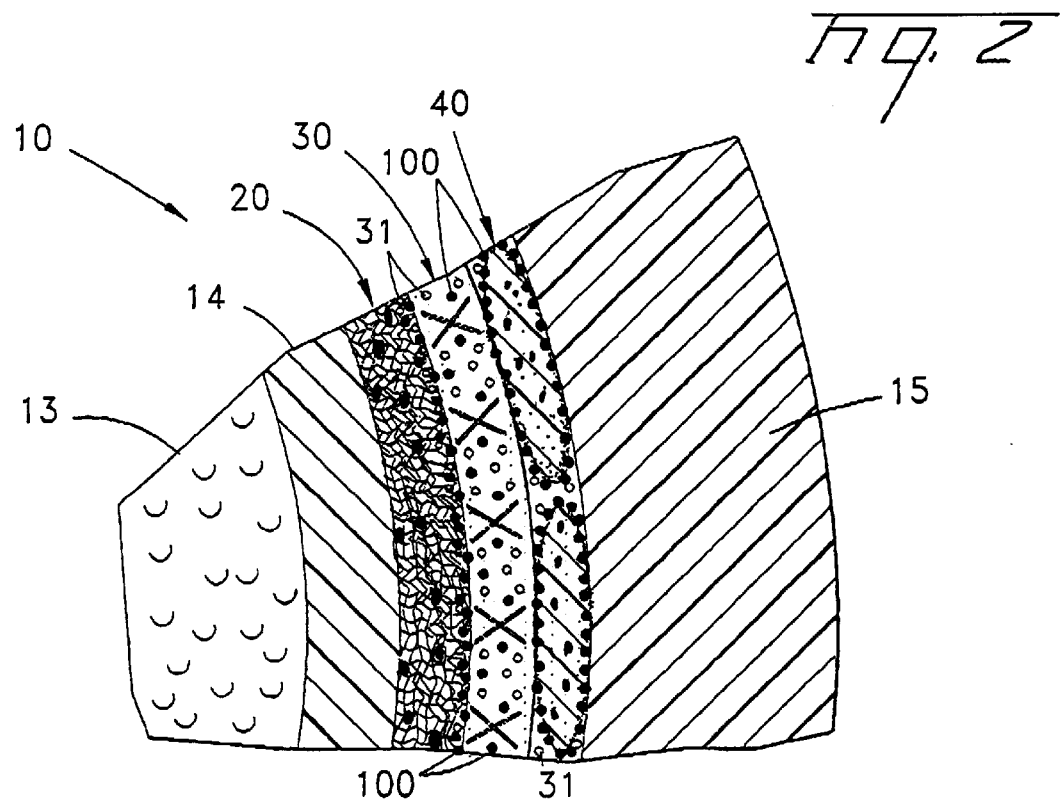
FIG. 2 is a portion of the partial cross section of the fiber optic cable of FIG. 1.

Referring to FIGS. 1–2, a fiber optic cable 10 according to the present invention will be described. Fiber optic cable 10, suitable for use in indoor applications, includes a conventional optical fiber ribbon stack 12 with optical fiber ribbons having optical fibers. Ribbon stack 12 is disposed in a water blocking material 13 which, in turn, is surrounded by a core tube 14. Core tube 14 is surrounded by an outer jacket 15. The space between core tube 14 and jacket 15 includes fiber optic cable components 20, 30, 40. Cable component 20, according to the present invention, advantageously provides strength and flame inhibiting capabilities to fiber optic cable 10, and may include a water blocking capability. Cable component 30, according to the present invention, advantageously has a flame inhibiting capability, and may include a water blocking capability. Cable component 40, according to the present invention, advantageously provides anti-buckling and flame inhibiting capabilities to fiber optic cable 10, and may include a water blocking capability. Fiber optic cable 10 meets flame and water blocking requirements, is manufactured at a low unit cost, and is easy to route through cable passageways.

Referring to FIGS. 2–3, component 20 will be further described. Cable component 20 includes, for example, conventional, high-modulus, fiberglass, polyester, or aramid fibrous strength members 24. Strength members surround core tube 14, and provide tensile strength to fiber optic cable 10. In a preferred embodiment of the present invention, component 20 includes a flame inhibiting agent 100, which agent is described in more detail hereinbelow. Substrate 20 may include a conventional superabsorbent material 31.

Referring to FIGS. 2–4, fiber optic cable component 30 comprises a substrate 34. In a preferred embodiment substrate 34 comprises, for example, a conventional spun-bonded non-woven polyester fabric which includes a porous web structure of non-woven fibers with interstices comprising air cells or pockets. Suitable alternative substrates may include: rayon; spunbonded nylon; non-woven or woven glass; polypropylene-melt blown non-woven fabric; polyurethane spunbonded fabric; paper; or a cellulose fabric. In addition, a commercially available Reemay polyester substrate may be used, such as is disclosed in U.S. Pat. No. 4,815,813. Substrate 34 preferably is controlled to optimize its porosity, flexibility and tensile strength characteristics. The porosity of substrate 34 is advantageous because it enables the substrate to accept a substantial quantity of flame inhibiting agent 100. Fiber optic cable component 30 includes at least one flame inhibiting agent 100, which agent is described in more detail hereinbelow. Substrate 20 may include a conventional superabsorbent material 31.

Referring to FIG. 6, fiber optic cable component 40 comprises yarns formed of, for example, aramid fibers impregnated with a resin material. The yarns define anti-buckling members 44, such as those disclosed in U.S. Pat. No. 4,913,517 and U.S. Pat. No. 5,082,719. According to the present invention, component 40 includes a flame inhibiting agent 100, which agent is described in more detail hereinbelow. Substrate 20 may include a superabsorbent material 31.

In a preferred embodiment of the present invention, manufacture of fiber optic cable component 30 is accomplished by way of application of the flame inhibiting agent 100 to substrate 34, where agent 100 is in the form of a latex binder system which includes a flame inhibiting chemical. Flame inhibiting agent 100 is applied to the substrate in an additive mode of treatment, for example, by immersion of substrate 34 in a bath of flame inhibiting agent 100. During immersion, flame inhibiting agent 100 will be applied to the surfaces of substrate 34 and become lodged, as by capillary action, in the interstices between the non-woven fibers of substrate 34. Next, substrate 34 with flame inhibiting agent 100 is oven-dried, whereby flame inhibiting agent 100 is dried onto the fibers of substrate 34 to form fiber optic cable component 30. Cable component 30 is then incorporated into fiber optic cable 10 in a conventional cable manufacturing operation thereby providing flame retardant capabilities to the cable.

Examples of flame inhibiting agents 100 according to the present invention may include: antimony trioxide; bromo-chlorinated paraffins; bromine-phosphorous compounds; chlorinated paraffins; aluminum trihydrate; zinc borate; magnesium hydroxide and tin compounds. Preferred latex binders include: acrylics with good tensile strength; ethylene-vinyl chloride copolymers; vinyl acetate-ethylene copolymers with excellent tensile strength; polyvinyl chloride and copolymers; styrene-butadiene copolymers; and polyvinyl acetate homopolymers. Ethylene-vinyl chloride copolymer with 40–50% chlorine may have good performance on either a polyester or rayon substrate. Commercially available latex-based flame inhibiting agents 100 include, for example: DE-60F or DE-83R with antimony oxide made available by Great Lakes Chemical Corporation; Firebrake ZB made available by U.S. Borax; Hydral 710 made available by Alcoa; or Caliban P-44 made available by White Chemical Corporation.

As an alternative to the additive mode of treatment, a fiber optical cable component 30' is made whereby flame inhibiting agent 100 is chemically reacted with the resin of which substrate 34 is made, i.e. in a reactive mode of treatment (FIG. 7). For example, prior to spunbonding of substrate 34, chemical bonds are made between flame inhibiting agent 100 and molecules in polymer chains of the resin. For example, direct application of a brominated or a chlorinated flame inhibiting agent 100, whereby agent 100 is chemically bonded to the molecular backbone of the polymer chain of substrate 34. In the reactive mode of treatment, as compared to the additive mode of treatment, the bond between the flame inhibiting agent and the substrate is more stable and may advantageously exhibit strong resistance to mechanical separation of the flame inhibiting agent from the substrate. Furthermore, a substrate 34 which has had a flame inhibiting agent chemically bonded thereto in a reactive process may then be treated with an additive process by, for example, immersion in a latex-based flame inhibiting mixture. The combination of the additive and reactive modes of treatment may result in a double-strength flame retardant cable component 30,30',30'''.

Additional alternative methods of incorporating a flame inhibiting agent 100 into substrate 34 include: spraying a topical coating of flame inhibiting agent 100 onto substrate 34 after the substrate has been treated with a superabsorbent material 31 (FIG. 5); spraying a latex-based flame inhibiting agent plus adhesive compound on substrate 34; dissolving a flame inhibiting chemical in a solvent and, by exhaustion of the solvent, forming a flame inhibiting agent residue on substrate 34; or by operation of an electro-static or adhesive type mode of treatment as described below in respect of components 20, 40. The forgoing methods assure that flame inhibiting agent 100 will be applied to the surfaces of substrate 34 and become lodged in the interstices between the non-woven fibers of substrate 34. Two substrates can be combined to hold flame inhibiting agent 100 and superabsorbent material 31 in place.

Moreover, cable component 30 may include a conventional superabsorbent material 31 (FIG. 4). Superabsorbent material 31 may be added to the latex-based flame inhibiting mixture to advantageously make a dry cable not requiring flooding compound. Alternatively, superabsorbent material 31 may be applied as a powder coating before or after the latex-based flame inhibiting mixture is applied to substrate 34 but before the mixture is dried. Conventional superabsorbent materials suitable for use in the present invention are disclosed in U.S. Pat. No. 4,913,517, which patent is incorporated by reference herein.

Preferably, manufacture of components 20, 40 according to the present invention may be accomplished as follows. As noted above, cable component 20 includes high-modulus polyester, fiberglass or aramid fibrous strength members 24. Anti-buckling members 40 comprise yarn-like articles. According to the present invention, the fibrous and yarnlike materials, and any impregnating resins thereon, comprise substrates with surfaces suitable for the application of flame inhibiting agent 100. The substrates of members 20, 40 may include interstices between the fibers or yarns thereof. In a first mode of treatment, a conventional electrostatic system may be used to apply agent 100 to the substrates of members 20, 40. The electrostatic system creates an electric charge on the particles, by corona or triboelectric effect, whereby the particles are fluidized or sprayed on and stick to the surfaces and become lodged in the interstices of the substrates of components 20, 40 by action of electromagnetic forces of attraction. The substrates of members 20, 40 are then fed into a bath comprising a latex binder of about 3–12% latex, and are then cured by forced air to dry the latex binder. Additionally, a conventional vibrating-powder box or powder pump may be used to apply flame inhibiting agent 100 as well.

Adhesive bonding may be used as an alternative to electro-attractive forces. The substrates of members 20, 40 are first wetted with an adhesive material, for example, as in the spraying action of a spray gun apparatus supplied with a suitable adhesive. Next, the substrates of members 20, 40 are fed into a conventional fluidized bed apparatus. The fluidized bed is produced by passing a stream of gas upwardly through a bed of particles of flame inhibiting agent 100. The particle size of flame inhibiting agent 100 is preferably less than 150 microns in diameter. The gas stream agitates the particles, such that the particles move at a sufficient velocity to suspend the particles in the gas. The particles impinge on and adhere to the wetted surfaces and become lodged in the intertstices of the substrates of members 20, 40. Next, the substrates of members 20, 40 with flame inhibiting agents adhered thereto are fed into a cooling/drying/curing apparatus for quick drying and firm affixation of the flame inhibiting agents on the substrates. Fiber optic components 20, 40 are then ready to be incorporated into fiber optic cable 10 in a conventional fiber optic cable manufacturing process, and to provide flame retardance, and respective strength or antibuckling capabilities to cable 10.

The mix of particles in the electro-static or adhesive type modes of treatment may comprise a combination of flame inhibiting particles 100 with superabsorbent particles, which superabsorbent particles will, along with the particles of flame inhibiting agent 100, adhere or stick to the surfaces and be disposed in the interstices of components 20, 40. Alternatively, agent 100 may be combined with an adhesive and the surfaces of the substrates of components 20, 40 coated therewith by immersion or spraying, followed by the fluidized bed of superabsorbent particles. Further, the components 20, 40 may be impregnated with a superabsorbent material prior to application of flame inhibiting agent 100 in any of the foregoing modes of treatment with respect to components 20, 40.

In achieving objectives of the present invention, fiber optic cable components 20, 30, 30',30'",40 are inexpensive to manufacture and the material costs are typically low as well, which results in a low-cost fiber optic cable. Moreover, a fiber optic cable made in accordance with the present invention does not require filling compounds outside of the core tube, which maintains a low production cost of the cable and makes the cable craft-friendly. Additionally, a fiber optic cable made according to the present invention is easy to route through passageways because the substrates are flexible.

Flame inhibiting agent 100 is advantageously chemically operative to inhibit combustion. This occurs in either or both of vapor phase combustion reactions or condensed phase combustion mechanisms. Vapor phase flame inhibiting compounds inhibit combustion by competing for available oxygen or producing non-combustible gases. Condensed phase combustion mechanism inhibitors, such as the formation of a char barrier on the burning material, inhibit combustion by physically preventing oxygen from reaching the combustion zone. In other words, flame inhibiting agent 100 is chemically operative during combustion in that it may: (1) redirect combustion and decomposition reactions toward evolution of gases which are non-combustible, or are heavy enough to interfere with the interchange of combustion gases and combustion air; (2) redirect decomposition and combustion reactions toward reduced heat of combustion; and/or (3) conserve the physical integrity of the material in order to impede access of oxygen and heat and reduce disintegration of the structure. Halogen type compounds, however, present a safety risk because burning or extensive heating thereof may generate heavy black smoke, hydrochloric acid, and toxic gasses. Zero-halogen type flame inhibiting agents are therefore preferred in certain applications. An advantage of the present invention is that, where a low or zero halogen cable application is required, flame inhibiting agent 100 may comprise zero-halogen compounds such as phosphorous, and the use of a PVC cable jacket can be eliminated and other zero-halogen jacket materials used instead. Moreover, where the substrates of members 20, 40 are sufficiently treated with flame inhibiting agent 100, substrate 34 may not be needed, thereby reducing the manufacturing cost and size of the fiber optic cable.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, although the invention has been described with reference to fiber optic cable 10, a cable suitable for use in indoor applications, the present invention may be practiced with outdoor or indoor/outdoor fiber optic cables, including fiber optic cables with or without buffer tubes, central strength members, water swellable yarns, electrical conductors, ripcords, binders, or other cable components.

What is claimed is:

1. A fiber optic cable comprising:
   a tube, said tube including at least one optical fiber therein;
   a flame-retardant jacket, said jacket surrounding said tube and being spaced therefrom defining at least one space between the tube and the jacket, said at least one space having fiber optic cable components disposed therein;
   said fiber optic cable components comprising strength members stranded around said tube, at least some of said strength members being multi-functional strength members, said multi-functional strength members providing tensile strength to said cable, and comprising a flame inhibiting agent additively or reactively combined with said multi-functional strength members whereby said multi-functional strength members are functional as flame inhibiting components, at least some of said multi-functional strength members additionally including a superabsorbent substance, said super absorbent substance being functional to inhibit the migration of water in said space.

2. The fiber optic cable of claim 1, said strength members comprising fibrous elements.

3. The fiber optic cable of claim 1, said flame inhibiting component comprising a flame inhibiting agent that is chemically operative to actively inhibit combustion by interfering with combustion reactions.

4. In a method for making a fiber optic cable, comprising the steps of:
   (a) providing a woven, non-woven, or fibrous substrate with surfaces and interstices;
   (b) reactively combining a flame inhibiting agent with said substrate, said flame inhibiting agent being chemically operative to inhibit combustion by interfering with combustion reactions;
   (a) applying a water swellable substance to said substrate before, during, or after step (b) thereby defining a multi-functional cable component;
   (b) associating the multi-functional cable component with a cable component comprising at least one optical fiber; and
   (c) extruding a cable jacket around said multi-functional cable component and said cable component comprising at least one optical fiber.

5. In the method of claim 4, said reactive process including chemically bonding a flame inhibiting agent to said substrate.

6. In a method for making a fiber optic cable, comprising the steps of:
   (c) providing a woven, non-woven, or fibrous substrate with surfaces and interstices;
   (d) additively combining a flame inhibiting agent with said substrate by an adhesive, electro-attractive or wetting process, said flame inhibiting agent being chemically operative to inhibit combustion by interfering with combustion reactions;
   (d) applying a water swellable substance to said substrate before, during, or after step (b) thereby defining a multi-functional cable component;
   (e) associating the multi-functional cable component with a cable component comprising at least one optical fiber; and
   (f) extruding a cable jacket around said multi-functional cable component and said cable component comprising at least one optical fiber.

* * * * *

UNITED STATES PATENT AND TRADEMARK OFFICE
CERTIFICATE OF CORRECTION

PATENT NO.    : 6,301,413 B1
DATED         : October 9, 2001
INVENTOR(S)   : Anne G. Bringuer It is certified that error appears in the above-identified patent and that said Letters Patent is hereby corrected as shown below:

Column 9,
Line 16, change "(a)" to -- (c) --
Line 19, change "(b)" to -- (d) --
Line 22, change "(c)" to -- (e) --

Column 10,
Line 6, change "(c)" to -- (a) --
Line 8, change "(d)" to -- (b) --
Line 13, change "(d)" to -- (c) --
Line 16, change "(e)" to -- (d) --
Line 19, change "(f)" to -- (e) --

Signed and Sealed this

Seventh Day of May, 2002

Attest:

JAMES E. ROGAN
Attesting Officer            Director of the United States Patent and Trademark Office